United States Patent [19]

Wallin

[11] 3,764,101
[45] Oct. 9, 1973

[54] KITCHEN MIXER IMPELLER AND MOLD FOR MAKING IT
[75] Inventor: Cus Waldemar Wallin, Waterbury, Conn.
[73] Assignee: Scovill Manufacturing Company, Waterbury, Conn.
[22] Filed: Feb. 2, 1973
[21] Appl. No.: 334,051

Related U.S. Application Data
[62] Division of Ser. No. 148,339, June 1, 1971, Pat. No. 3,734,643.

[52] U.S. Cl.................. 249/160, 416/227, 425/242
[51] Int. Cl.............................................. B29c 1/16
[58] Field of Search.................... 249/160; 425/334, 425/242; 416/227

[56] References Cited
UNITED STATES PATENTS
3,441,254    4/1969    Merke, Jr. ...................... 425/242 X Primary Examiner—Robert D. Baldwin
Assistant Examiner—V. K. Rising
Attorney—Dallett Hoopes

[57] ABSTRACT

An integral impeller having equally spaced blades and a two-piece mold for making it. The impeller is cast by rotating all blades slightly with respect to the mold parting plane and a plane perpendicular to the parting plane.

3 Claims, 4 Drawing Figures

PATENTED OCT 9 1973 3,764,101

KITCHEN MIXER IMPELLER AND MOLD FOR MAKING IT

This is a division of application Ser. No. 148,339, filed on June 1, 1971 and now U.S. Pat. No. 3,734,643 issued May 12, 1973.

This invention relates to a mold for making a kitchen mixer impeller and the impeller itself. More specifically, this invention relates to a two-piece mold adapted to make an integral impeller having equi-spaced open blades and the impeller itself.

In the prior art, there are a number of patents covering construction of impellers for kitchen mixers. Most of these constructions involve a plurality of parts which are riveted, soldered, or otherwise fastened together. The hand labor involved in making such beaters has made the need for an integrally molded impeller increasingly urgent. One answer to this need was provided in U.S. Pat. No. 3,441,254, in which an impeller and mold for making it were disclosed by Joseph P. Merke, Jr. Products as described in that patent have been objectionable, however, in that the blades were not equi-spaced. Equi-spacing of blades could not be achieved, according to Merke, and still have the mold halves part on the plane of two opposite blades.

The inability of impellers made according to the invention of Merke to have equi-spaced blades has resulted in serious disadvantages. When, as is usual, two such impellers are mounted in a kitchen mixer head and driven to counter rotate and intermesh, there has often been interference between the blades of the two impellers. In addition, the irregular spacing has resulted in less efficient mixing, awkward appearance, and poor balance.

Under the present invention, a mold is provided which overomes the objections to the impeller on the Merke patent in that the spacing of the blades is uniform, eliminating interference during intermeshing in use and providing a superior mixing and balance and an attractive appearance.

Further features and objects of the invention will be apparent from a reading of the following specification and an examination of the attached drawings wherein.

Briefly, the invention is an impeller having equi-spaced blades and a two-piece mold for making it. The impeller is cast by rotating all blades slightly with respect to the mold parting plane and a plane perpendicular to the parting plane.

Figure 1:
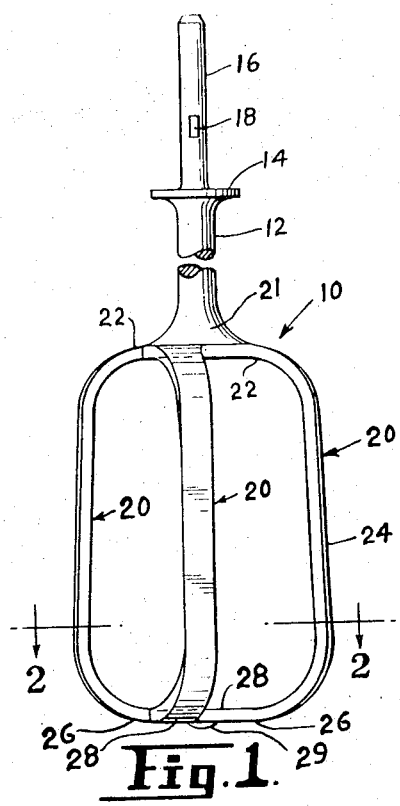
FIG. 1 shows in broken fashion an impeller made by a mold embodying the invention.

Referring more specifically to the drawings, an impeller embodying the invention is generally designated 10 in FIG. 1,. It comprises a stem 12 having a stop shoulder 14 and thereabove a stub shaft 16. As is conventional, the shaft has driving ears 18 diametrically disposed thereon.

Figure 2:
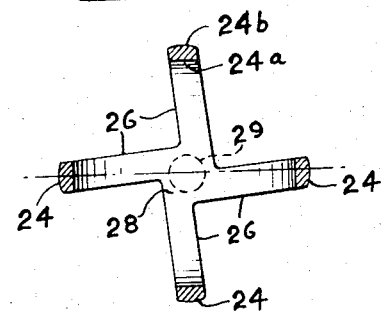
FIG. 2 is a sectional view taken on the line 2—2 of FIG. 1.

The impeller comprises four equally spaced blades 20. Each blade extends tangentially out from the lower end of the hub 21 on stem 12. As shown in FIG. 2, the first run 22 of the blades each extends out along a line parallel to a radius of the hub. The blades then curve down into a second, vertical run 24, the second runs being 90° apart with respect to the axis of the impeller. The blades then curve inward in final 26 runs parallel to the first runs and tangentially merge with a lower hub 28 with downward nib 29. As shown in FIG. 2, the blades, in their vertical runs 24, have inside surfaces 24a which are each perpendicular to a radius of the impeller. The outside surfaces 24b are generally also perpendicular to a radius. The blades are relatively thin, for instance, 0.08 inches in an actual mold.

Figure 3:
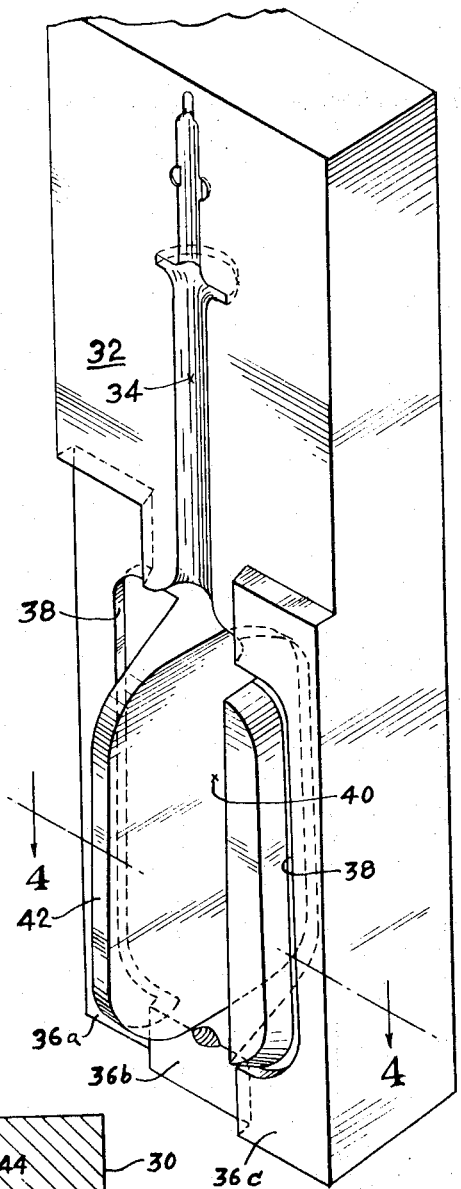
FIG. 3 is a perspective view of one of the mold parts embodying the invention.
Figure 4:
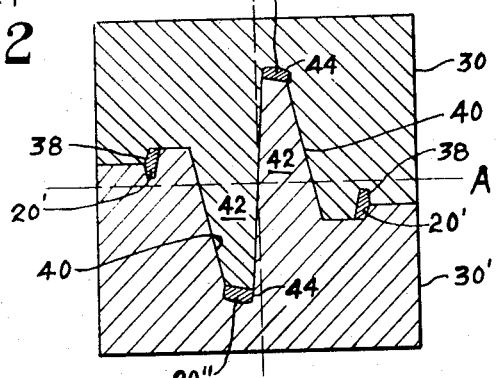
FIG. 4 is a sectional view showing the mold closed at about the line 4—4 of FIG. 3 and showing the blades of an impeller in section.

A half of a mold for making the above-described impeller is shown in FIG. 3. The mold halves may be substantially identical and they are provided with mating faces. In the stem portion of the mold, the mold features a single parting plane 32 having mating grooves 34 in which the stem and stub shaft are formed. In the blade portion of the impeller, the mold half is provided with a stepped plane 36a, 36b, 36c. Cooperating grooves 38 on the two mold halves for a first pair of diametrically oppsed blades 20' and are arranged so that the channels forming the blades are on opposite sides of the plane A (FIG. 4) which aligns with the plane of 36b and plane 32 and is the plane of the axis of the stem.

Each of the mold halves 30 and 30' (FIG. 4) has a deep slot 40 between the grooves 38 and alongside the deep slot an upright rib 42 is provided, receivable into the slot 40 of the other mold half. The ribs and slots together define channels 44 for forming a second pair 20'' of diametrically opposed blades. The channels for the second pair are on opposite sides of a second plane B (FIG. 4) which is perpendicular to the first plane A.

When the mold halves 30 and 30' are closed and plastic material is injected into the cavities between the mold halves, an impeller is formed which, when withdrawn from its mold, provides equi-spaced blades. Preferably, the plastic material is molten zinc or other metal which gives strength to the thin blades and may be readily finished and plated to provide a superior product.

While the invention has been shown in but one form, reasonable variations may fall within the invention which may be defined by the following claim language:

I claim:

1. A mold for integrally forming a kitchen mixer impeller having uniformly spaced blades, which comprises a pair of mold halves, the mold halves having mating faces provided with cooperating grooves defining channels for forming a stem and a first pair of diametrically opposed blades, the channels for the first pair of blades being offset from and on opposite sides respectively of a first plane which passes through the axis of the stem and which is perpendicular to the direction in which the molds separate, each of the mold halves having a deep slot extending inwardly thereof between the first pair of blade grooves and alongside the deep slot an upright rib receivable in the slot of the other mold half, the ribs and slots defining channels for forming a second pair of diametrically opposed blades, the channels for the second pair of blades being on opposite sides respectively of a second plane which is perpendicular to the first plane and which passes through the axis of the stem, the blade channels being spaced circumferentially uniformly with respect to the axis of the stem.

2. A mold as described in claim 1 wherein the parting line of the mold is stepped so that it is, with the adjacent blade channels of the first pair, disposed on alternate sides of the first plane.

3. A mold as described in claim 1 wherein the channels for each of the blades are thin and substantially flat and disposed in a plane perpendicular to a plane passing through the axis and including the longitudinal centerline of the channel.

* * * * *